United States Patent
Vymenets et al.

(10) Patent No.: US 9,301,107 B2
(45) Date of Patent: *Mar. 29, 2016

(54) METHODS AND APPARATUS FOR PROVIDING PRESENTATIONS FOR THE COMPOSITION OF MESSAGES HAVING SIZE LIMITATIONS

(71) Applicant: BlackBerry Limited, Waterloo (CA)

(72) Inventors: Leonid Vymenets, North York (CA); Henry Yao-Tsu Chen, Redmond, WA (US); Francis Thomas Riddle, Andover, MA (US)

(73) Assignee: BlackBerry Limited, Waterloo (CA)

( * ) Notice: Subject to any disclaimer, the term of this patent is extended or adjusted under 35 U.S.C. 154(b) by 160 days.

This patent is subject to a terminal disclaimer.

(21) Appl. No.: 13/902,233

(22) Filed: May 24, 2013

(65) Prior Publication Data
US 2013/0260837 A1    Oct. 3, 2013

Related U.S. Application Data

(63) Continuation of application No. 13/149,238, filed on May 31, 2011, now Pat. No. 8,478,352.

(51) Int. Cl.
| | | |
|---|---|---|
| *H04N 1/38* | (2006.01) | |
| *H04W 4/12* | (2009.01) | |
| *H04M 1/725* | (2006.01) | |

(52) U.S. Cl.
CPC ............ *H04W 4/12* (2013.01); *H04M 1/72552* (2013.01)

(58) Field of Classification Search
CPC ....................................................... H04W 4/12
USPC ................ 455/566, 466, 404.1, 412.1, 412.2
See application file for complete search history.

(56) References Cited

U.S. PATENT DOCUMENTS

| | | | | |
|---|---|---|---|---|
| 6,023,231 A | * | 2/2000 | Tsunoda | ...................... 340/7.55 |
| 7,278,099 B2 | * | 10/2007 | Pugliese | ...................... 715/255 |
| 8,478,352 B2 | * | 7/2013 | Vymenets et al. | ............. 455/566 |

* cited by examiner

*Primary Examiner* — Sanh Phu
(74) *Attorney, Agent, or Firm* — Jenna L. Wilson; Dimock Stratton LLP

(57) ABSTRACT

A communication device provides a message composition interface. In the message composition interface, the communication device presents a maximum allowable remaining number of characters allowable for further entry in the message only when a character count of the number of character inputs received in the message is greater than or equal to a warning count value. The warning count value is less than a maximum allowable number of characters of the message.

20 Claims, 11 Drawing Sheets

FIG. 1
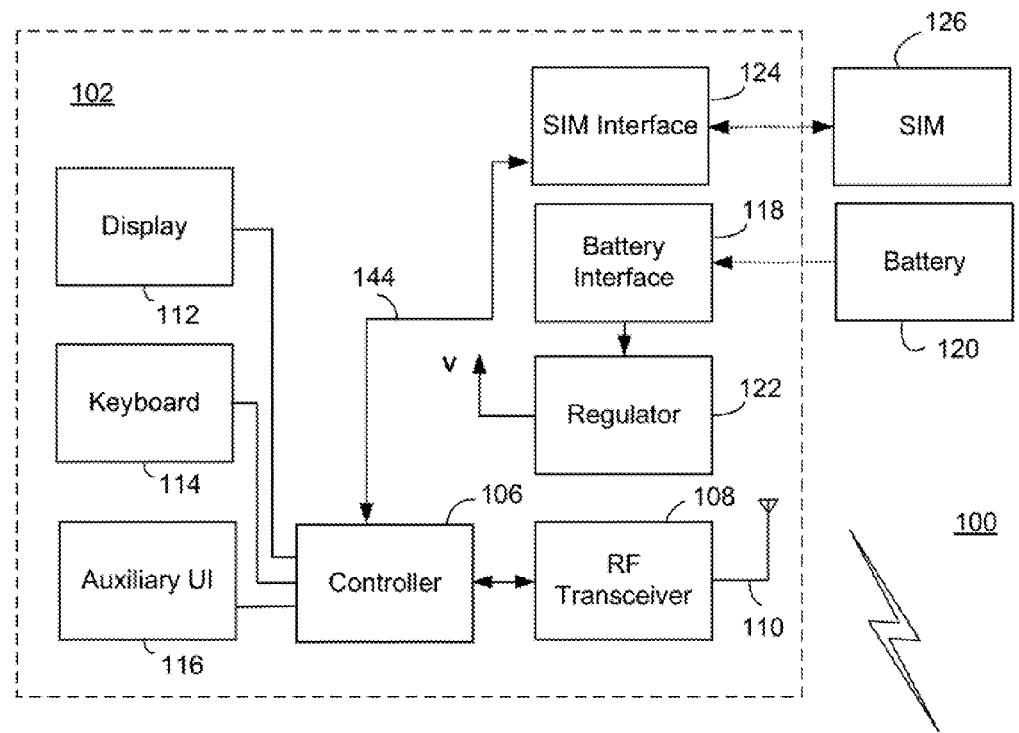
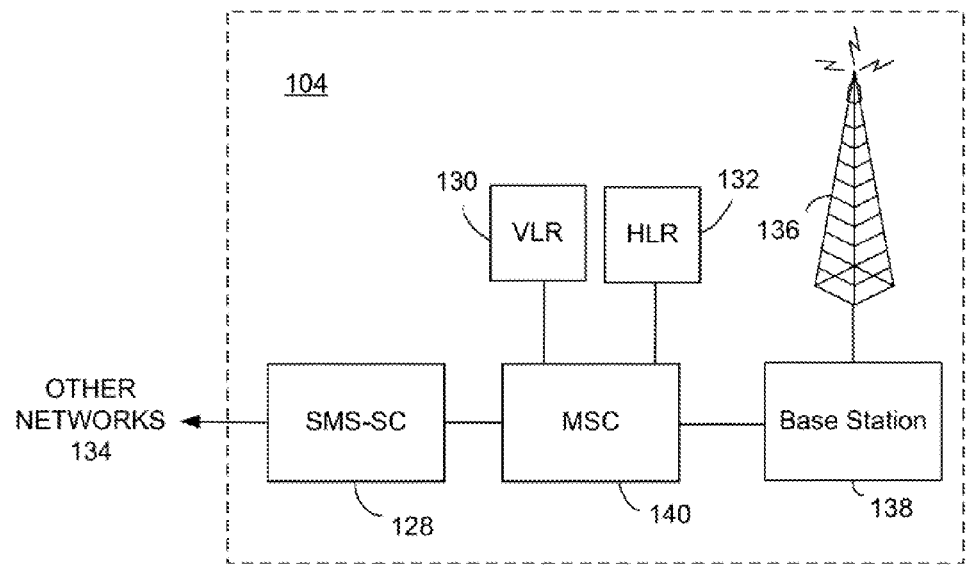

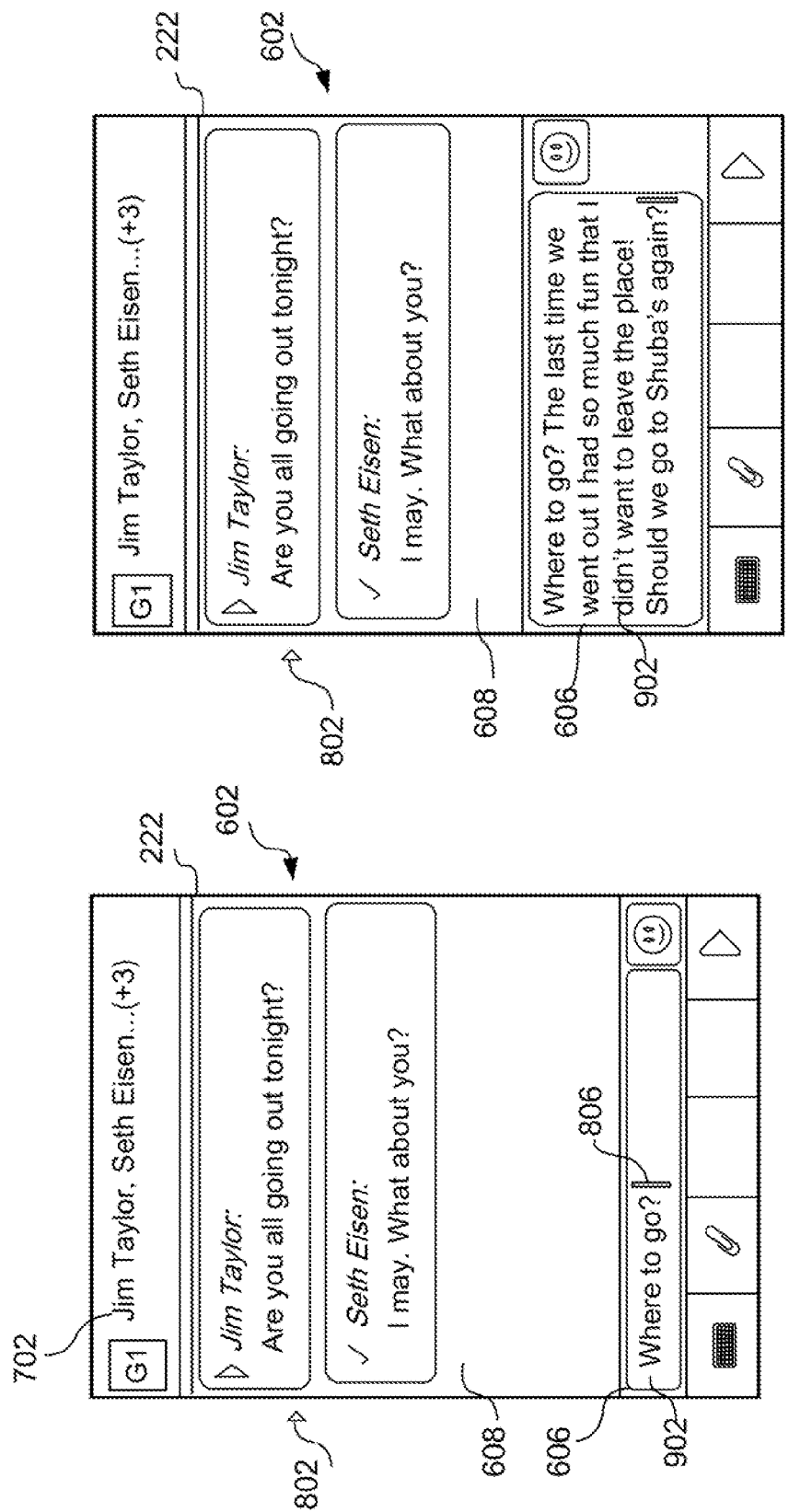

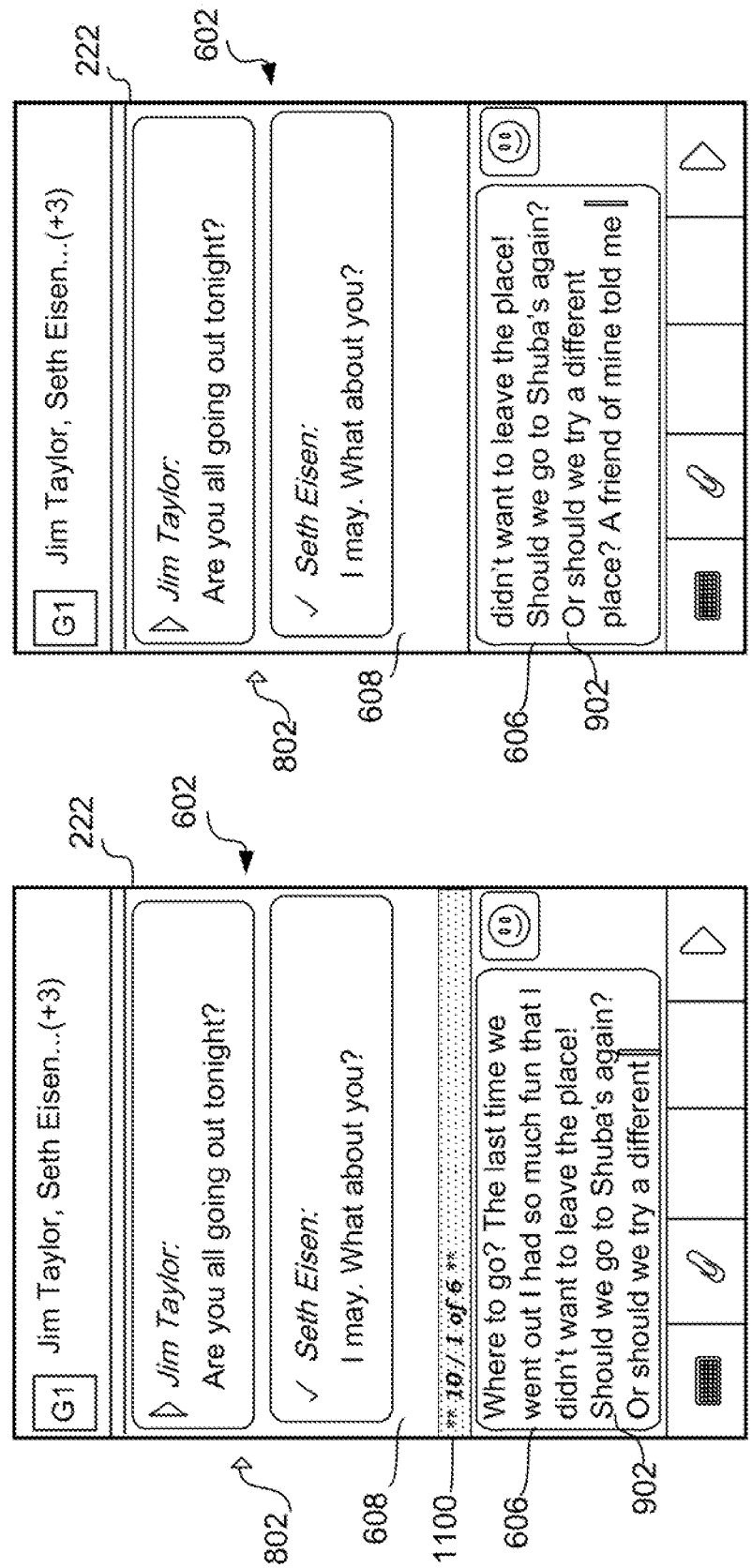

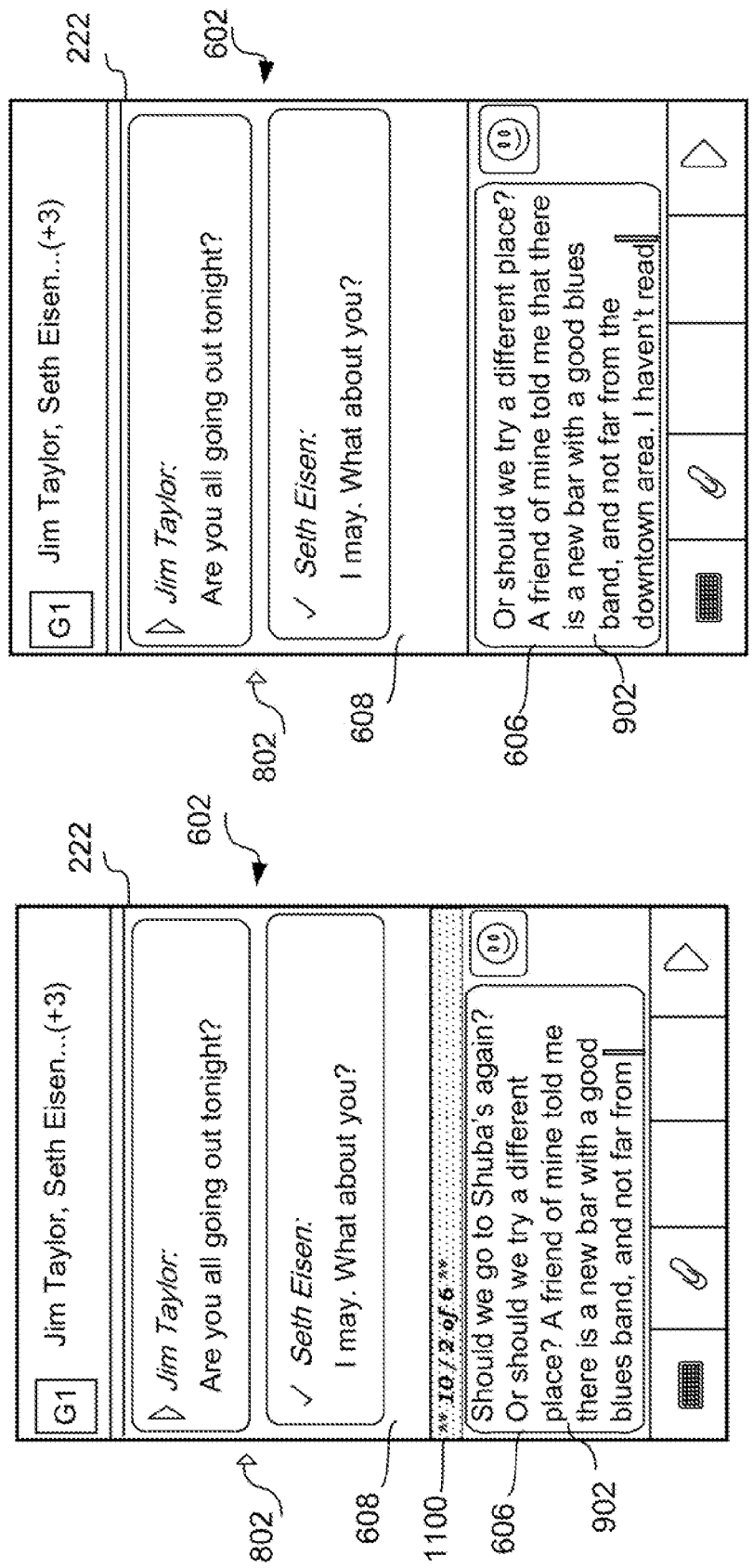

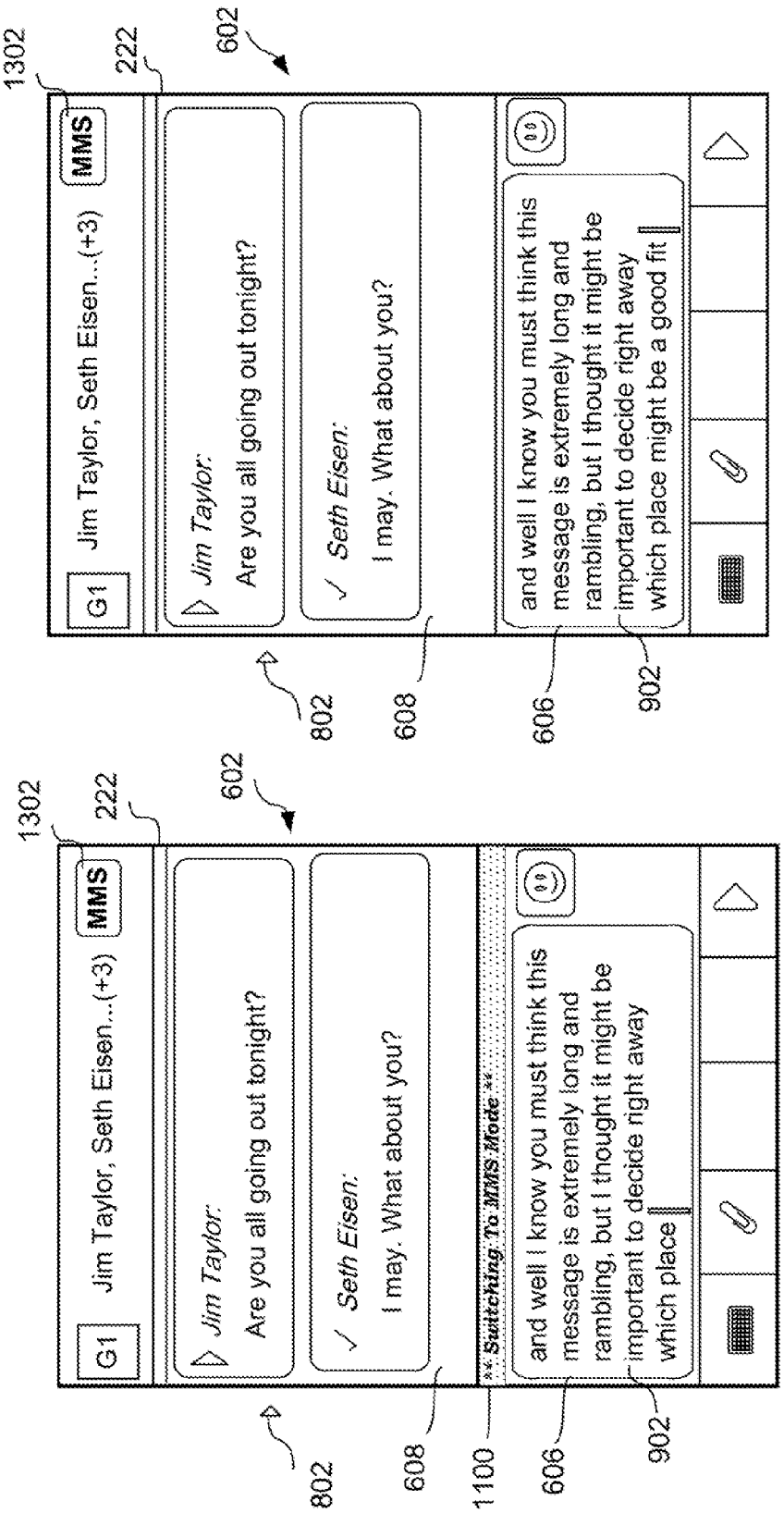

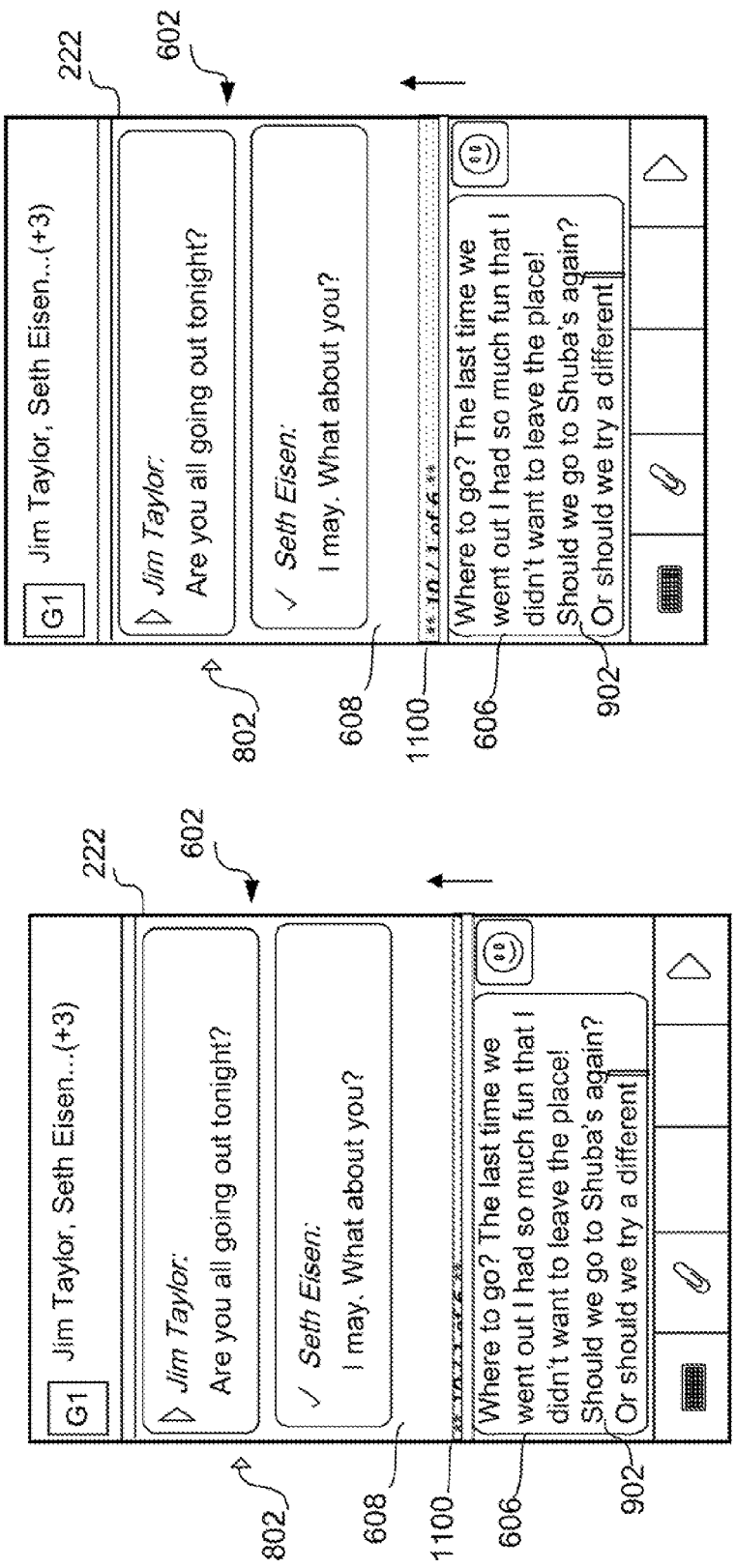

METHODS AND APPARATUS FOR PROVIDING PRESENTATIONS FOR THE COMPOSITION OF MESSAGES HAVING SIZE LIMITATIONS

CROSS-REFERENCE TO RELATED APPLICATION

This application is a continuation of and claims priority to U.S. non-provisional patent application having application Ser. No. 13/149,238 and filing date of 31 May 2011, now U.S. Pat. No. 8,478,352, which is hereby incorporated by referenced herein.

BACKGROUND

1. Field of the Technology

The present disclosure relates generally to communication devices and messaging, and more particularly to user interface techniques for use providing a presentation for the composition of messages having size limitations.

2. Description of the Related Art

Today, wireless communication devices which operate in wireless communication networks have many capabilities, which may include a wireless messaging capability. Wireless messaging may include text messaging, such as short message service (SMS) messaging, multimedia messaging service (MMS) messaging, electronic-mail (e-mail) messaging, instant messaging, as a few examples.

Some of these types of messaging capabilities, such as SMS messaging, may have limitations on the number of characters permitted in each message, and/or limitations on the number of characters permitted in each message segment utilized to construct a message, and/or limitations on the number of messages segments utilized to construct a message. In some environments, it may be preferable for the user of the wireless communication device to be informed of such limitations during composition of a message (e.g. for reasons of cost).

What are needed are advantageous methods and apparatus for use in a wireless communication device for processing such messages, including methods and apparatus for use in providing presentations for the composition of such messages.

BRIEF DESCRIPTION OF THE DRAWINGS

Embodiments of present disclosure will now be described by way of example with reference to attached figures, wherein:

FIG. 1 is a block diagram of a communication system which includes a wireless communication device for communicating in a wireless communication network;

FIGS. 7-14 are presentations in a display of the wireless communication device which correspond to various actions made in association with the methods described in relation to FIG. 4 and FIGS. 5-6; and FIGS. 15-16 are presentations to help show in what manner an alert bar (e.g. the alert bars of FIGS. 9, 11, and/or 13) may be initially presented in (and/or removed from) the display, being set in motion from an initial hidden position to a final, fixed, revealed position, with several (continuous) intermediate positions therebetween, snapshots of which are shown in FIGS. 15-16.

DETAILED DESCRIPTION OF THE EMBODIMENTS

Figure 2:
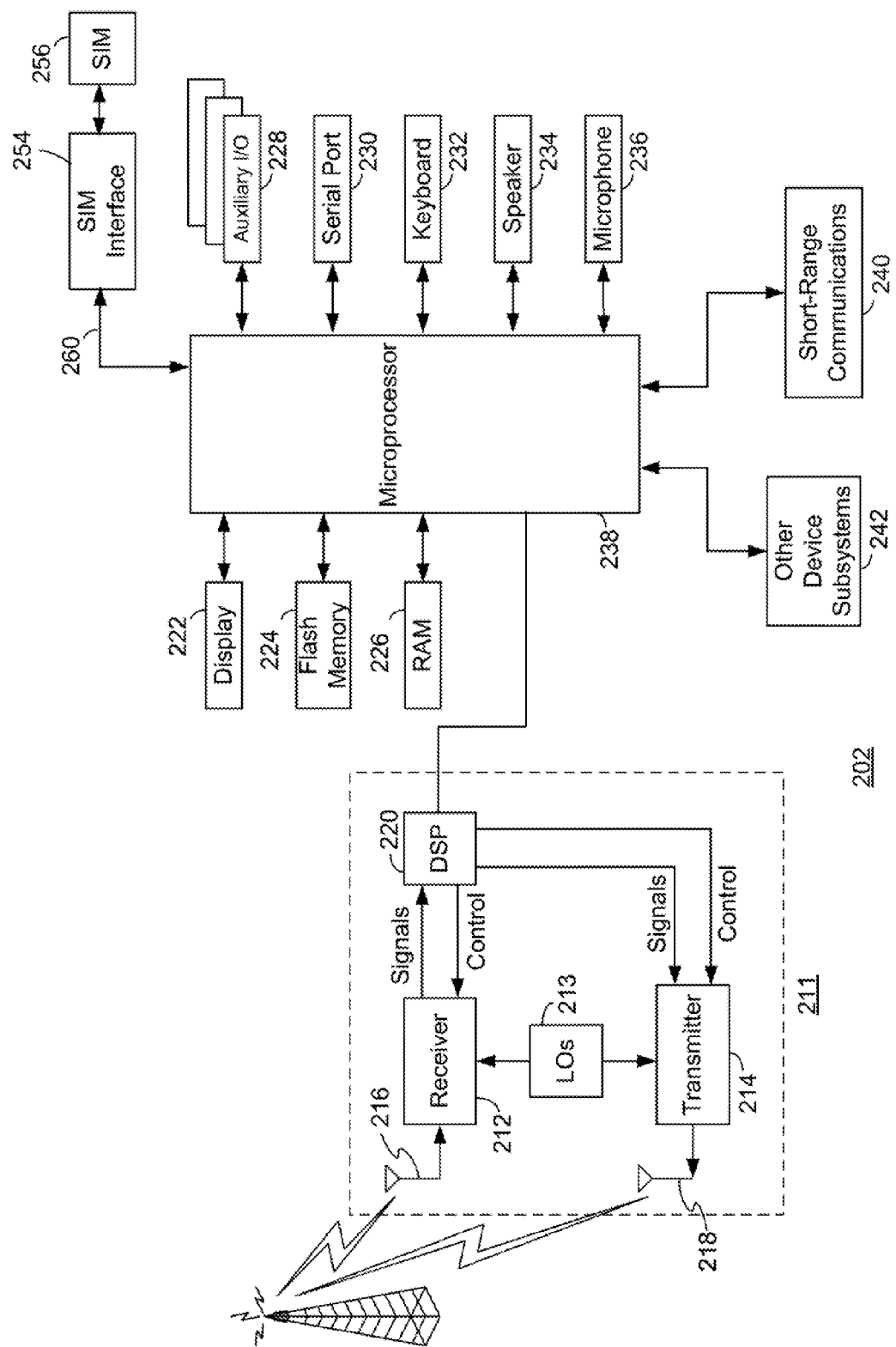
FIG. 2 is a more detailed example of a wireless communication device for use in the wireless communication network.

Methods and apparatus for use in providing presentations for the composition of messages having size limitations are described. In one illustrative technique, the communication device receives, via its user interface, one or more character inputs in a message composition field for a new message being composed. While a character count of the message is less than a warning count value, the device refrains from presenting the number of allowed characters remaining for entry in the message. On the other hand, while the character count is greater than or equal to the warning count value, the device causes the number of allowed characters remaining for entry in the message to be presented for display. In one example, the number of allowed characters remaining for entry is provided in an alert bar, which is presented by being set in motion from an initial hidden position behind the message composition field to a final revealed position, with intermediate positions therebetween.

To illustrate one exemplary environment within which the present techniques may be practiced, FIG. 1 is a block diagram of a communication system 100 which includes a wireless communication device 102 which communicates through a wireless communication network 104. Wireless communication device 102 may include a display 112, a keyboard 114, and one or more auxiliary user interfaces (UI) 116, each of which is coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 normally controls overall operation of wireless device 102, whereas signal processing operations associated with communication functions are typically performed in RF transceiver circuitry 108. Controller 106 interfaces with device display 112 to display received information, stored information, input requests, and the like. Keyboard 114, which may be a telephone type keypad or full alphanumeric keyboard, is normally provided for entering data for storage in wireless device 102, information for transmission to network 104, a telephone number to place a telephone call, commands to be executed on wireless device 102, and possibly other or different input requests. In one embodiment, keyboard 114 may be or include a physical keyboard or a virtual or "soft" keyboard, implemented, for example, by way of images of keys rendered on a touch screen display.

Wireless device 102 sends communication signals to and receives communication signals from network 104 over a wireless link via antenna 110. RF transceiver circuitry 108 performs functions similar to those of base station 138, including for example modulation/demodulation and possibly encoding/decoding and encryption/decryption. It is also contemplated that RF transceiver circuitry 108 may perform certain functions in addition to those performed by base station 138. It will be apparent to those skilled in art that RF transceiver circuitry 108 will be adapted to particular wireless network or networks in which wireless device 102 is intended to operate.

Wireless device 102 includes a battery interface 118 for receiving one or more rechargeable batteries 120. Battery 120 provides electrical power to (most if not all) electrical circuitry in wireless device 102, and battery interface 118 provides for a mechanical and electrical connection for battery 120. Battery interface 118 is coupled to a regulator 122 which regulates power for the device. When wireless device 102 is fully operational, an RF transmitter of RF transceiver circuitry 108 is typically keyed or turned on only when it is sending to network 104, and is otherwise turned off to conserve resources. Such intermittent operation of transmitter has a dramatic effect on power consumption of wireless device 102. Similarly, an RF receiver of RF transceiver circuitry 108 is typically periodically turned off to conserve power until it is needed to receive signals or information (if at all) during designated time periods.

Wireless device 102 may consist of a single unit, such as a data communication device, a cellular telephone, a multiple-function communication device with data and voice communication capabilities such as a mobile telephone with data communication functionality, a personal digital assistant (PDA) enabled for wireless communication, a tablet computing device, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a wireless device 102 may have a more particular implementation as described later in relation to wireless device 202 of FIG. 2.

Wireless device 102 may operate using a Subscriber Identity Module (SIM) 126 which is connected to or inserted in wireless device 102 at a SIM interface 124. SIM 126 is one type of a conventional "smart card" used to identify an end user (or subscriber) of wireless device 102 and to personalize the device, among other things. Without SIM 126, the wireless device terminal is not fully operational for communication through wireless network 104. By inserting SIM 126 into wireless device 102, an end user can have access to any and all of his/her subscribed services. In order to identify the subscriber, SIM 126 contains some user parameters such as an International Mobile Subscriber Identity (IMSI) and a Mobile Station Integrated International Service Digital Network (MSISDN). In addition, SIM 126 is typically protected by a four-digit Personal Identification Number (PIN) which is stored therein and known only by the end user. An advantage of using SIM 126 is that end users are not necessarily bound by any single physical wireless device. Typically, the only element that personalizes a wireless device terminal is a SIM card. Therefore, the user can access subscribed services using any wireless device equipped to operate with the user's SIM.

Some information stored on SIM 126 (e.g., address book and SMS messages) may be retrieved and visually displayed on display 112. Wireless device 102 has one or more software applications which are executed by controller 106 to facilitate the information stored on SIM 126 to be displayed on display 112. Controller 106 and SIM interface 124 have data and control lines 144 coupled therebetween to facilitate the transfer of the information between controller 106 and SIM interface 124 so that the information may be visually displayed. An end user enters input requests at keyboard 114, for example, and in response, controller 106 controls SIM interface 124 and SIM 126 to retrieve the information for display. The end user may also enter input requests at keyboard 114, for example, and, in response, controller 106 controls SIM interface 124 and SIM 126 to store information on SIM 126 for later retrieval and viewing. The software applications executed by controller 106 may include an application to retrieve and display address book information stored on SIM 126, and an application to retrieve and display SMS message information stored on SIM 126.

Wireless device 102 communicates in and through wireless communication network 104. In the embodiment of FIG. 1, wireless network 104 is a Global Systems for Mobile (GSM) and General Packet Radio Service (GPRS) network. Wireless network 104 includes a base station 138 with an associated antenna tower 136, a Mobile Switching Center (MSC) 140, a Visitor Location Register (VLR) 130, a Home Location Register (HLR) 132, and a Short Message Service Center (SMS-SC) 128. MSC 140 is coupled to base station 138 and to SMS-SC 128, which is in turn coupled to other network(s) 134.

Base station 138, including its associated controller and antenna tower 136, provides wireless network coverage for a particular coverage area commonly referred to as a "cell". Base station 138 transmits communication signals to and receives communication signals from wireless devices within its cell via antenna tower 136. Base station 138 normally performs such functions as modulation and possibly encoding and/or encryption of signals to be transmitted to the wireless device in accordance with particular, usually predetermined, communication protocols and parameters, under control of its controller. Base station 138 similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless device 102. Those skilled in art will appreciate that a wireless network in actual practice may include hundreds of cells, each served by a distinct base station 138 and transceiver, depending upon desired overall expanse of network coverage. All base station controllers and base stations may be connected by multiple switches and routers (not shown), controlled by multiple network controllers.

For all wireless devices 102 registered with a network operator, permanent data (such as wireless device 102 user's profile) as well as temporary data (such as wireless device's 102 current location) are stored in HLR 132, In case of a voice call to wireless device 102, HLR 132 is queried to determine the current location of wireless device 102. VLR 130 is responsible for a group of location areas and stores the data of those wireless devices that are currently in its area of responsibility. This includes parts of the permanent wireless device data that have been transmitted from HLR 132 to VLR 130 for faster access. However, VLR 130 may also assign and store local data, such as temporary identifications. Optionally, VLR 130 can be enhanced for more efficient co-ordination of GPRS and non-GPRS services and functionality (e.g., paging for circuit-switched calls, and combined GPRS and non-GPRS location updates).

Being part of the GPRS network, a Serving GPRS Support Node (SGSN) is at the same hierarchical level as MSC 140 and keeps track of the individual locations of wireless devices. An SGSN also performs security functions and access control. Further, a Gateway GPRS Support Node (GGSN) provides interworking with external packet-switched networks and is connected with SGSNs via an IP-based GPRS backbone network. The SGSN performs authentication and cipher setting procedures based on the same algorithms, keys, and criteria as in existing GSM. For SMS transfer over GPRS, the SGSN is used in place of MSC 140.

In order to access GPRS services, wireless device 102 first makes its presence known to wireless network 104 by performing what is known as a GPRS "attach". This operation establishes a logical link between wireless device 102 and the SGSN and makes wireless device 102 available to receive, for example, pages via SGSN, notifications of incoming GPRS data, or SMS messages over GPRS. In order to send and receive GPRS data, wireless device 102 assists in activating the packet data address that it wants to use. This operation makes wireless device 102 known to the GGSN; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and the GGSN.

SMS makes use of SMS-SC 128 which acts as a store-and-forward system for relaying short messages. Messages are stored in the network until the destination device becomes available, so a user can receive or transmit an SMS message at any time, whether a voice call is in progress or not. SMS-SC 128 may be integrated with a Gateway MSC for Short Message Service (SMS-GMSC) and an Interworking MSC for Short Message Service (SMS-IWMSC), as would be the case shown in FIG. 1. An SMS-GMSC is a function for receiving a short message from an SMS-SC, interrogating an HLR for routing information and SMS info, and delivering the short message for the recipient MS. An SMS-IWMSC is a function for receiving a short message from within the network and submitting it to the recipient SMS-SC. Other messages which may be delivered are Multimedia Messaging Service (MMS) messages. The above configuration may be provided in substantial accordance with $3^{rd}$ Generation Partnership Project, Technical Specification 03.40, V6.2.0, 2001-12 (Release 1997) (3GPP TS 03.40).

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1.

FIG. 2 is a detailed block diagram of an exemplary wireless communication device 202. Wireless device 202 may be a two-way communication device having at least voice and data communication capabilities, including the capability to communicate with other computer systems. Depending on the functionality provided, wireless device 202 may be referred to as a data messaging device, a two-way pager, a cellular telephone with data messaging capabilities, a wireless Internet appliance, or a data communication device (with or without telephony capabilities). Wireless device 202 may be a mobile station.

If wireless device 202 is enabled for two-way communication, wireless device 202 will normally incorporate a communication subsystem 211, which includes a receiver 212, a transmitter 214, and associated components, such as one or more (e.g., embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which wireless device 202 is intended to operate.

Network access requirements will also vary depending upon type of network utilized. In GPRS networks, for example, network access is associated with a subscriber or user of wireless device 202. A GPRS device therefore operates in conjunction with a Subscriber Identity Module, commonly referred to as a "SIM" card 256, in order to operate on the GPRS network. Without such a SIM card 256, a GPRS device will not be fully functional. Local or non-network communication functions (if any) may be operable, but wireless device 202 will be unable to carry out any functions involving communications over the network. SIM 256 includes those features described in relation to FIG. 1.

Wireless device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in the example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Wireless device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines 260 extend between SIM interface 254 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM), a battery backed-up RAM, or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on wireless device 202. A predetermined set of applications which control basic device operations, including at least data and voice communication applications (such as a user interface technique), will normally be installed on wireless device 202 during its manufacture. One exemplary application that may be loaded onto wireless device 202 may be a personal information manager (PIM) application having the ability to organize and manage data items relating to user such as, but not limited to, e-mail, calendar events, voice mails, appointments, and task items. Naturally, one or more memory stores are available on wireless device 202 and SIM 256 to facilitate storage of NM data items and other information.

The PIM application has the ability to send and receive data items via the wireless network. In an exemplary embodiment, PIM data items are seamlessly integrated, synchronized, and updated via the wireless network, with the wireless device user's corresponding data items stored and/or associated with a host computer system thereby creating a mirrored host computer on wireless device 202 with respect to such items. This is especially advantageous where the host computer system is the wireless device user's office computer system. Additional applications may also be loaded onto wireless device 202 through network, an auxiliary I/O subsystem 228, serial port 230, short-range communications subsystem 240, or any other suitable subsystem 242, and installed by a user in RAM 226 or a non-volatile store for execution by microprocessor 238. Such flexibility in application installation increases the functionality of wireless device 202 and may provide enhanced on-device functions, communication-related functions, or both. For example, secure communication applications may enable electronic commerce functions and other such financial transactions to be performed using wireless device 202.

In a data communication mode, data such as an SMS message will be processed by communication subsystem 211 and input to microprocessor 238. Microprocessor 238 may further process the signal for output to display 222 or alternatively to auxiliary I/O device 228, A user of wireless device 202 may also compose data items, such as SMS messages, using keyboard 232 in conjunction with display 222 and possibly auxiliary I/O device 228. Keyboard 232 may be a complete alphanumeric keyboard and/or telephone-type keypad. In one embodiment, keyboard 232 may be or include a physical keyboard or a virtual or "soft" keyboard, implemented, for example, by way of images of keys rendered on a touch screen display. The composed items may be transmitted over a communication network through communication subsystem 211.

For voice communications, the overall operation of wireless device 202 is substantially similar, except that the received signals are output to speaker 234 and signals for transmission are generated by microphone 236. Alternative voice or audio I/O subsystems, such as a voice message recording subsystem, may also be implemented on wireless device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to wireless device 202 other than through a wireless communication network. The alternate download path may, for example, be used to load an encryption key onto wireless device 202 through a direct and thus reliable and trusted connection to thereby provide secure device communication.

Short-range communications subsystem 240 of FIG. 2 is an additional optional component which provides for communication between wireless device 202 and different systems or devices, which need not necessarily be similar devices. For example, subsystem 240 may include an infrared device and associated circuits and components, a Bluetooth™ communication module, or an 802.11 communication module, to provide for communication with similarly-enabled systems and devices. Bluetooth™ is a registered trademark of Bluetooth SIG, Inc. Those skilled in the art will appreciate that "Bluetooth" and "802.11" refer to sets of specifications, available from the Institute of Electrical and Electronics Engineers (IEEE), relating to wireless personal area networks and wireless local area networks, respectively.

Wireless device 202 also includes a battery interface (such as that described in relation to FIG. 1) for receiving one or more rechargeable batteries. Such a battery provides electrical power to most if not all electrical circuitry in wireless device 202, and the battery interface provides for a mechanical and electrical connection for it. The battery interface is coupled to a regulator which regulates a voltage to all of the circuitry.

Figure 3:
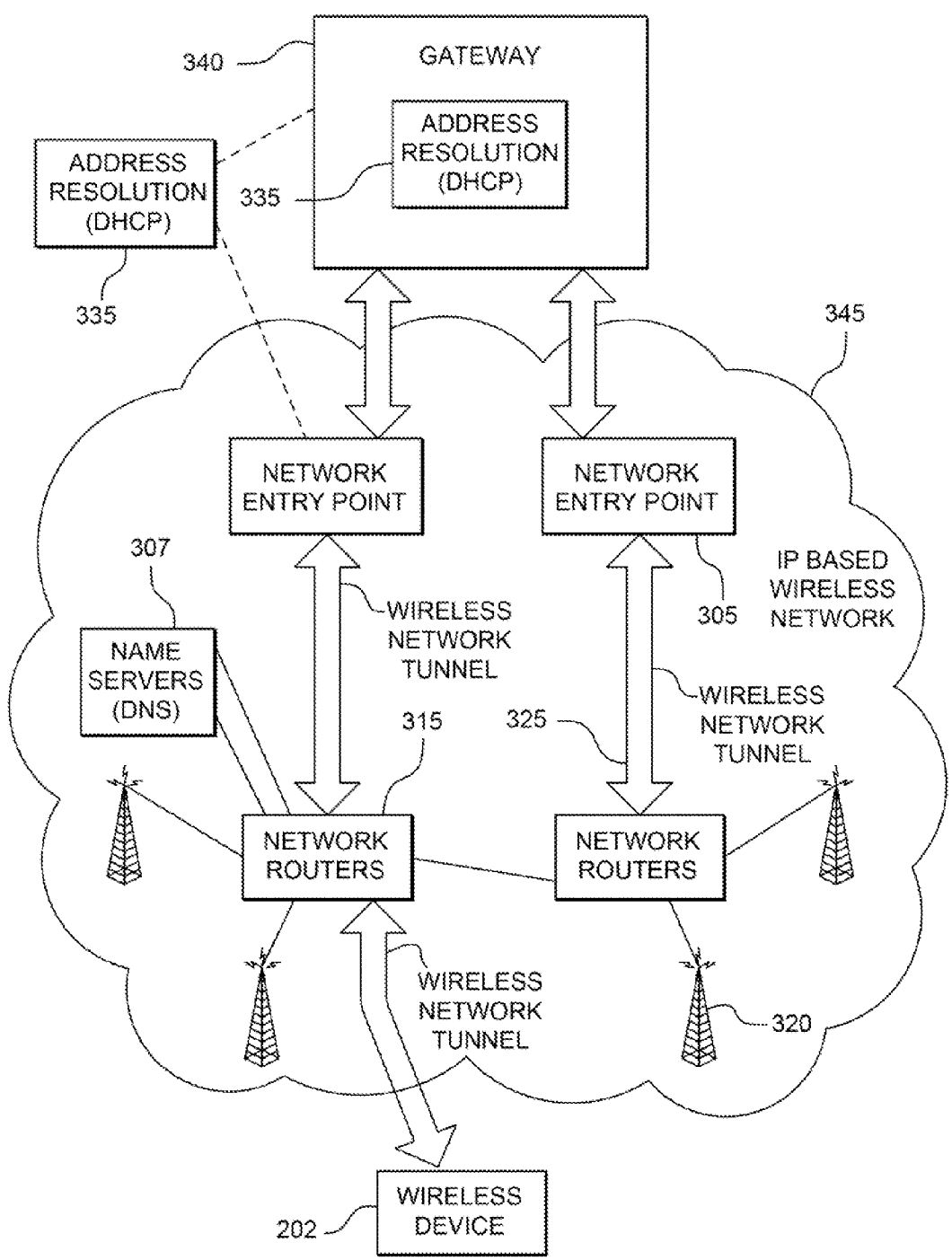
FIG. 3 is a particular structure of a system for communicating with the wireless communication device.

FIG. 3 shows a particular system architecture for communicating with a wireless communication device. In particular, FIG. 3 shows basic components of an IP-based wireless data network, such as a GPRS network, Wireless device 202 communicates with a wireless packet data network 345, and may also be capable of communicating with a wireless voice network (not shown). The voice network may be associated with the IP-based wireless network as similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305. Such network architecture may facilitate the communication of data messages, such as multimedia messaging service (MMS) messages.

As shown in FIG. 3, a gateway 340 may be coupled to an internal or external address resolution component 335 and one or more network entry points 305. Data packets are transmitted from gateway 340, which is source of information to be transmitted to wireless device 202, through wireless network 345 by setting up a wireless network tunnel 325 from gateway 340 to wireless device 202. In order to create this wireless tunnel 325, a unique network address is associated with wireless device 202. In an IP-based wireless network, however, network addresses are typically not permanently assigned to a particular wireless device 202 but instead are dynamically allocated on an as-needed basis. Thus, wireless device 202 may acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and wireless devices. In this example, address resolution component 335 is shown as a dynamic host configuration protocol (DHCP) server as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize a plurality (e.g., thousands) of base stations 320 normally implemented in a relatively large network into a central location for a long-haul connection back to network entry point 305. In some networks there may be multiple tiers of network routers 315 and there may be cases where there are master and slave network routers 315, but in all such cases the functions of network routers 315 are similar. Often network router 315 will access a name server 307, in this case shown as a dynamic name server (DNS) 307 as used in the Internet, to look up destinations for routing data messages. Base stations 320, as described above, provide wireless links to wireless devices such as wireless device 202.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e., data sessions). To open wireless tunnel 325, wireless device 202 may use a specific technique associated with wireless network 345. The step of opening such a wireless tunnel 325 may require wireless device 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one wireless device 202 for redundancy, or to access different gateways and services on the network. Once the domain name is found, the tunnel is then extended to network entry point 305 and necessary resources are allocated at each of the nodes along the way. Network entry point 305 then uses address resolution component 335 (e.g., DHCP server 335) to allocate an IP address for wireless device 202. When an IP address has been allocated to wireless device 202 and communicated to gateway 340, information can then be forwarded from gateway 340 to wireless device 202.

Wireless tunnel 325 typically has a limited life, depending on wireless device's 202 coverage profile and activity. Wireless network 345 will tear down wireless tunnel 325 after a certain period of inactivity or out-of-coverage period, in order to recapture resources held by this wireless tunnel 325 for other users. The main reason for this is to reclaim the IP address temporarily reserved for wireless device 202 when wireless tunnel 325 was first opened. Once the IP address is lost and wireless tunnel 325 is torn down, gateway 340 loses all ability to initiate IP data packets to wireless device 202, whether over Transmission Control Protocol (TCP) or over User Datagram Protocol (UDP).

In the present disclosure, an IP-based wireless network (which is one specific type of wireless communication network) may include but is not limited to (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS). It is to be understood that although particular IP-based wireless networks have been described, techniques of the present disclosure could be utilized in any suitable type of wireless network. Note that the infrastructure shown and described in relation to FIG. 3 may be representative of each one of a number of different communication networks which are provided and available in the same geographic region. One of these communication networks will be selected by the wireless device, either in an automatic or manual fashion, for communications.

Figure 4:
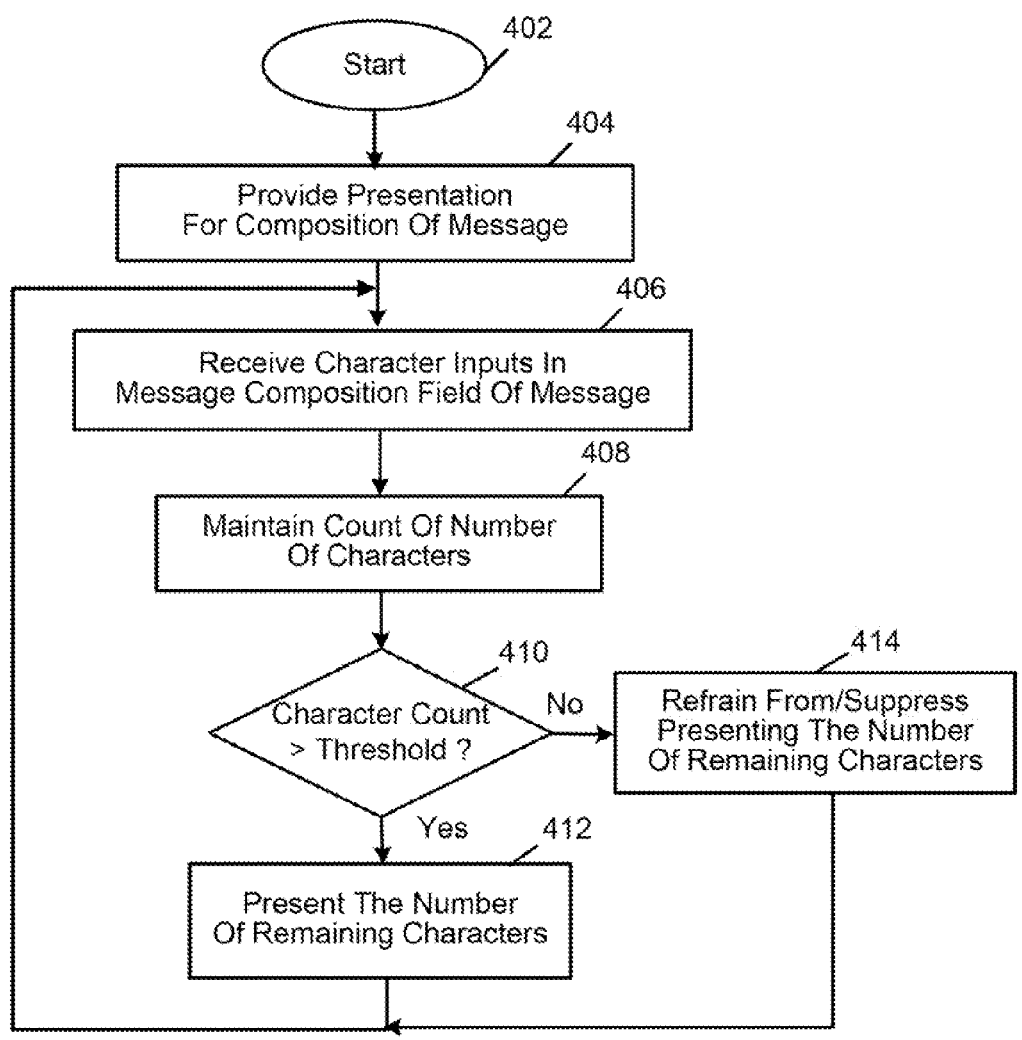
FIG. 4 is a flowchart for describing a general method for use in providing a presentation for the composition of messages having size limitations.

FIG. 4 is a flowchart for describing a general method for use in providing presentations for the composition of messages having size limitations. Such method is suitable for use in a communication device, such as the wireless communication device described above in relation to FIGS. 1-3. In particular, the techniques described in relation to the flowchart may be performed by one or more controllers or processors of the communication device, for example, in accordance with instructions in a messaging application. A computer program product which may embody the technique may include a computer readable medium (e.g., memory of the communication device, computer disk, CD-ROM, etc.) having computer instructions stored therein which are executable by the one or more processors of the communication device for performing the technique. These computer instructions may be embodied as part of the messaging application of the communication device.

In the method of FIG. 4, the processor executes the messaging application for an end user to compose and transmit a new message from the communication device. Note that some messaging types (e.g. for SMS) are provided with limitations on the number of characters permitted in each message. More particularly, where the messaging utilizes a plurality message segments for constructing a single message, there may be limitations imposed on the number of characters permitted in each message segment. Even further, there may be limitations imposed on the number of messages segments that may be utilized to construct the message. In this exemplary scenario, the maximum number of message segments utilized for constructing a message is six (6), and the maximum number of characters permitted in each message segment is one-hundred and sixty four (164).

Beginning at a start block 402 of FIG. 4, the processor operates to provide a presentation in a display for the composition of the message (step 404 of FIG. 4). This presentation includes a message composition field for the message being composed. In the composition of the message, the user of the communication device enters, via the user interface, characters (e.g. alphanumeric characters, text) in the message composition field. In turn, the processor receives one or more character inputs in the message composition field of the message (step 406 of FIG. 4). Character inputs may be characters that are added to or deleted from the message composition field.

The processor maintains a character count of the number of characters in the message composition field (step 408 of FIG. 4). The processor also continually monitors whether the character count is greater than or less than a warning count value (step 410 of FIG. 4). The warning count value is a number that is less than the maximum number of characters permitted in the message or message segment, e.g. by a predetermined number. For example, the maximum number of characters permitted in the message may be one hundred and sixty four (164), the predetermined number may be ten (10), and the warning count value may be one hundred and fifty four (154). Other suitable numbers and values may be utilized as well.

While the processor identifies the character count be less than the warning count value ("No" branch from step 410), the processor refrains from causing the number of allowed characters remaining for entry in the message to be presented in the display (step 414 of FIG. 4), On the other hand, while the processor identifies the character count to be greater than or equal to the warning count value ("Yes" branch from step 406), the processor causes the number of allowed characters remaining for entry in the message to be presented in the display (step 412 of FIG. 4).

Note further that, when the message is completed and transmission is desired, the processor will cause the message to be suitably formatted and transmitted via a wireless network through use of a Short. Message Service (SMS), or alternatively a Multimedia Messaging Service (MMS).

As described earlier above, each message may be constructed as one or more message segments, where the maximum number of characters permitted in a message is actually the maximum number of characters permitted in each message segment. In this case, the processor may maintain a message segment count of the number of message segments utilized for constructing or formatting the message. When the character count exceeds the maximum number of characters of the message segment, the processor operates to increment the message segment count and reset the character count (e.g. Char_Count="0"). This process is described in more detail in relation to the method of FIGS. 5-6. Note that, in one variation on the method of FIG. 4, the presentation includes the character count instead of the number of allowed characters remaining for entry in the message.

Figure 5:
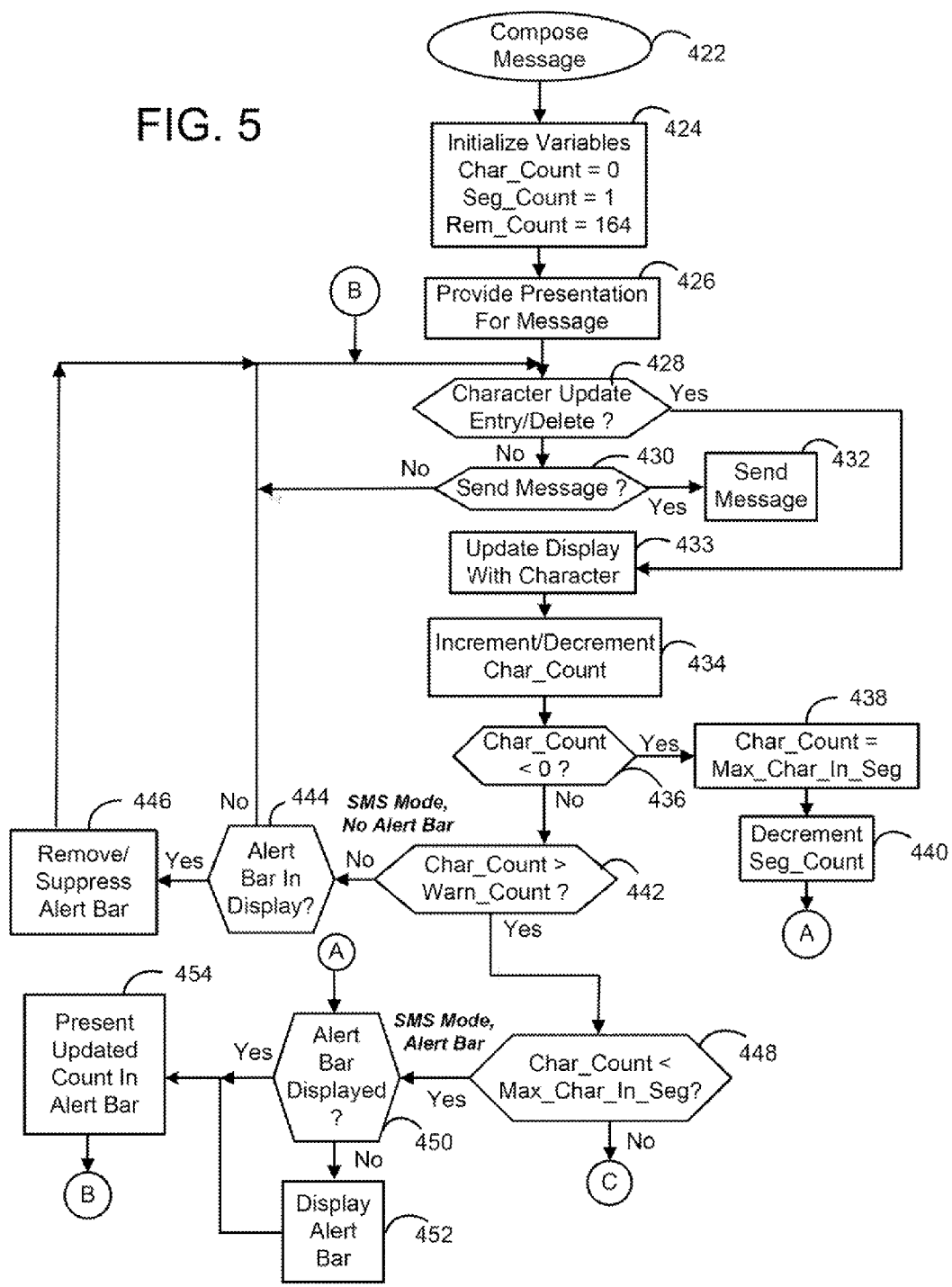
FIGS. 5-6 form another flowchart of a more detailed description of the method for providing a presentation for the composition of messages having size limitations, using an alert bar for providing an alert of the number of remaining characters.
Figure 6:
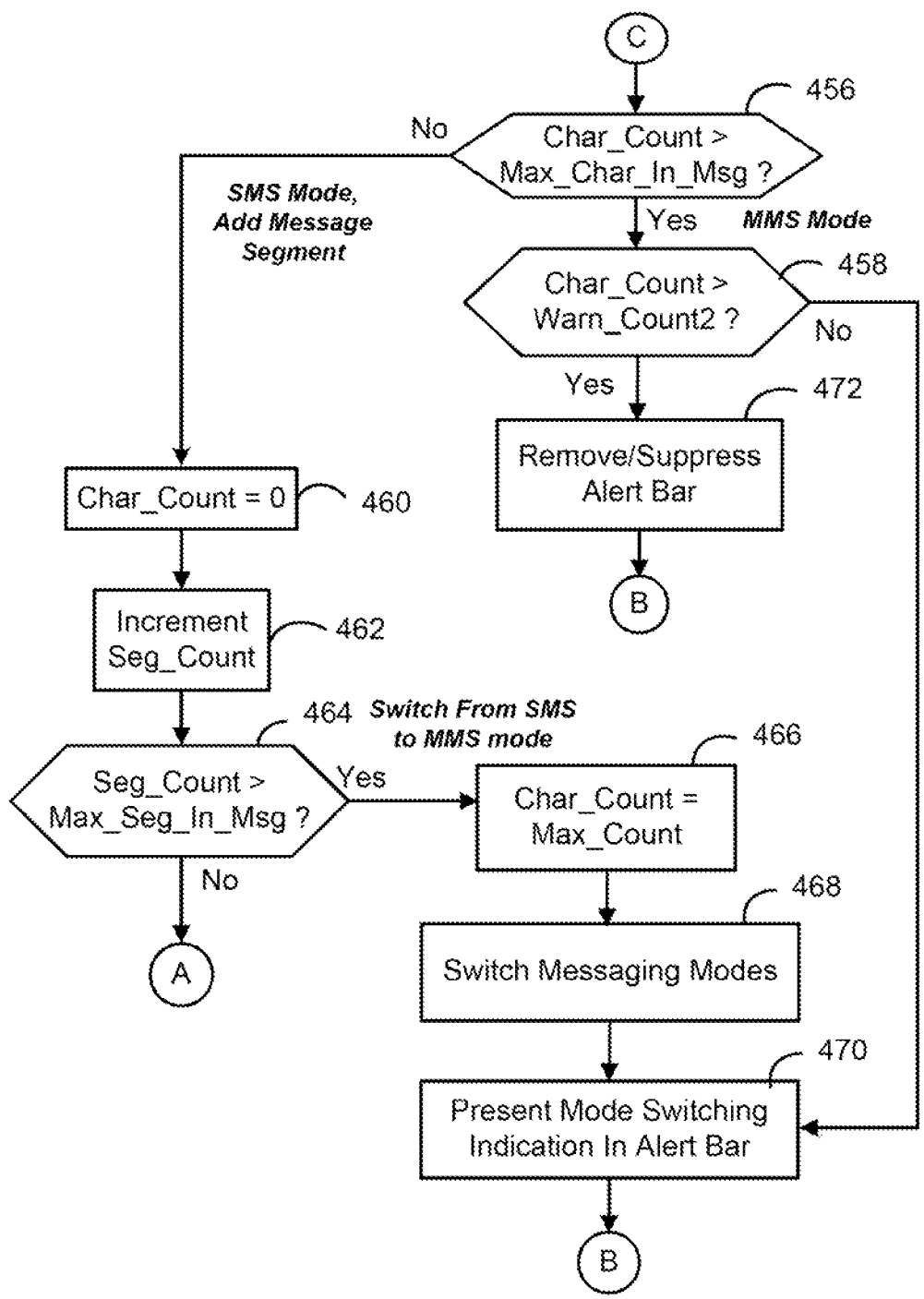

FIGS. 5-6 form a flowchart which describes a more detailed method for use in providing presentations for the composition of messages having size limitations (i.e. providing more details to the method described in relation to FIG. 4). In particular, amongst other things in this more detailed technique of FIGS. 5-6, an alert bar is utilized for the presentation; the alert bar may include the number of allowed characters remaining for entry in the message or message segment being composed, the number of remaining message segments left in the message, and/or a messaging mode (switching) indication. The method of FIGS. 5-6 is suitable for use in a communication device, such as the wireless communication device described above in relation to FIGS. 1-3. In particular, the techniques described in relation to the flowchart of FIGS. 5-6 may be performed by one or more controllers or processors of the communication device, for example, in accordance with instructions in a messaging application. A computer program product which may embody the technique may include a computer readable medium (e.g., memory of the communication device, computer disk, CD-ROM, etc.) having computer instructions stored therein which are executable by the one or more processors of the communication device for performing the technique. These computer instructions may be embodied as part of the messaging application of the communication device.

As described previously, the processor executes the messaging application for an end user to compose and transmit a new message from the communication device. In the technique, the processor maintains a character count (i.e. "Char_Count"), a message segment count (i.e. "Seg_Count"), and a remaining character count ("Rem_Count"). Char_Count is the current number of characters entered in the message composition field for a message segment. Seg_Count is the current number of message segments being utilized for constructing or formatting the message. Rem_Count is the current number of allowed characters remaining for entry in the message segment (e.g. Rem_Count=Max_Char_In_Seg−Char_Count). In this example, it will be assumed that the maximum number of characters permitted in a message segment (i.e. "Max_Char_In_Seg") is one hundred and sixty four (164), the maximum number of message segments utilized for constructing or formatting a message (i.e. "Max_Seg_In_Msg") is six (6), and the warning count value (i.e. "Warn_Count") is one hundred and fifty four (154).

Beginning at a start block 422 of FIG. 5 ("Compose Message"), the processor initializes variables (step 424 of FIG. 5). This step includes the initialization of the character count (Char_Count=0), initialization of the message segment count (Seg_Count=1), and initialization of the remaining character count (Rem_Count=164). The processor also causes a presentation to be displayed for the composition of the message (step 426 of FIG. 5). The presentation includes a message composition field for the new message being composed.

During composition of the message, the user of the communication device may enter, via the user interface, one or more characters in the message composition field. In turn then, the processor may receive one or more character inputs in the message composition field (step 428 of FIG. 5). Character inputs may be characters that are added to or deleted from the message composition field. If the process identifies no character update (to add, to delete, etc.) in step 428, then the processor identifies whether an instruction to send the message is received via the user interface (step 430 of FIG. 5). If the instruction to send the message is received ("Yes" at step 430), then the processor causes the message to be sent through the wireless transceiver via the wireless network (step 432 of FIG. 5). The processor may construct, format, and transmit the message via the wireless network with use of SMS messaging, or alternatively through MMS messaging. This will depend on the messaging mode utilized, which will depend on the total number of characters entered. For simple text messages, the initial messaging mode utilized is SMS messaging, but will be switched to MMS messaging if the character count exceeds a maximum count.

On the other hand in step 428, if the processor identifies a character update (to add, to delete, etc.), the processor updates the presentation in accordance with the added or deleted character (step 433 of FIG. 5). The processor also increments or decrements the character count ("Char_Count") accordingly (step 434 of FIG. 5). That is, the processor increments Char_Count if a new character is added, or decrements Char_Count if an existing character is deleted.

The processor identifies whether the character count is less than zero (step 436 of FIG. 5). This condition only occurs if the user has deleted a character after exceeding the maximum number of characters permitted in a message segment (e.g. 164). If the character count is less than zero in step 436, the processor sets the character count to be equal to the maximum number of characters permitted in a message segment (e.g.

164) (step 438 of FIG. 5). The processor also decrements the message segment count (step 440 of FIG. 5). Operation then proceeds to step 450 through Connector A, described later below.

If the character count is greater than or equal to zero in step 436 (i.e. normal condition), the processor identifies whether the character count is greater than the warning count value (e.g. Warn_Count) (step 442 of FIG. 5). If the character count is less than or equal to the warning count value in step 442, then the processor identifies whether the alert bar is currently being presented in the display (step 444 of FIG. 5). If the alert bar is currently being presented in the display in step 444, then the processor updates the presentation to remove or suppress the presentation of the alert bar (step 446 of FIG. 5). If the alert bar is not currently being presented in step 444, or after step 446, processing goes back to step 428.

On the other hand in step 442, if the character count is greater than the warning count value, then the processor identifies whether the character count is less than the maximum number of characters in the message segment (i.e. "Max_Char_In_Seg") (step 448 of FIG. 5). If the character count is less than Max_Char_In_Seg in step 448, then the processor identifies whether the alert bar is currently being presented in the display (step 450 of FIG. 5). If the alert bar is not currently presented in the display in step 450, then the processor causes the alert bar to be presented in the display (step 452 of FIG. 5). Thus, when the character count meets the warning count value, the number of allowed characters remaining for entry in the message is presented. If the alert bar is currently being presented in the display in step 450, or after step 452, the processor causes the updated number of remaining characters allowed in the message segment (i.e. Rem_Count) to be presented in the alert bar (step 454 of FIG. 5). In addition, the processor may also cause the message segment count (i.e. Seg_Count) to be presented in the alert bar adjacent to the Rem_Count (e.g. "1 OF 6", "2 OF 6", "3 OF 6", etc.). Processing proceeds back to step 428 through Connector B.

The effect of steps 442, 444, 446, 448, 450, 452, and/or 454 is that the alert bar which includes remaining character count and/or message segment count is presented only when the character count is closely approaching the maximum count, for each message segment. Note that, in one variation on this method, the presentation includes the character count instead of the number of allowed characters remaining for entry.

On the other hand in step 448 of FIG. 5, if the character count is greater than or equal than Max_Char_In_Seg, then processing continues step 456 in FIG. 6 through Connector C. Continuing in FIG. 6 at step 456, the processor identifies whether the character count is greater than the maximum number of characters permitted in a message segment (step 456 of FIG. 6). If in step 456 the character count is less than or equal to the maximum number of characters permitted in a message segment, then the processor proceeds to reset the character count (e.g. Char_Count=0) (step 460 of FIG. 6) and increment the message segment count (step 462 of FIG. 6). The processor then identifies whether the message segment count is greater than the maximum number of segments permitted in a message (step 464 of FIG. 6). If no in step 464, processing proceeds through Connector A back to step 450 of FIG. 5, where the updated character count and message segment count are presented.

If at step 464 the message segment count is greater than the maximum number of segments permitted in a message, then the processor will cause a switching of the current messaging mode to a different messaging mode (e.g. switch from SMS messaging mode to MMS messaging mode). Here, the processor sets the character count to the maximum count (maximum count=Max_Char_In_Seg×Max_Seg_In_Msg) (step 466 of FIG. 6), causes the current messaging mode to be switched to a different messaging mode (e.g. switches from SMS messaging mode to MMS messaging mode), and causes a messaging mode switching indication to be presented in the alert bar (step 470 of FIG. 6). For example, the messaging mode switching indication in the alert bar may recite "Switching From SMS to MMS". Processing the proceeds through Connector B to step 428 of FIG. 5. In addition, a messaging mode indication 1802 may be presented in the display. For example, the messaging mode indication may indicate "MMS".

However, in step 456, if the character count is greater than the maximum number of characters permitted in a message segment, then the processor identifies whether the character count is greater than a second warning count value (e.g. "Warn_Count2") (step 458 of FIG. 6). The second warning count value may be equal to Max_Char_In_Msg plus a predetermined number (e.g. a few characters, such as five (5) characters). If in step 458 the character count is less than or equal to the second warning count value, processing proceeds to step 470 where the messaging mode switching indication is still presented in the alert bar. If in step 458 the character count is greater than the second warning count value, then the processor causes the presentation of the alert bar to be removed or suppressed (step 472 of FIG. 6). However, the messaging mode indication (e.g. "MMS") may remain presented in the display (i.e. so long as the character count exceeds the maximum count). Processing the proceeds through Connector B to step 428 of FIG. 5.

The effect of steps 458, 470, and/or 472 is that the alert bar which includes remaining character count and/or message segment count is presented only when the character count is closely approaching the maximum count. The further effect of steps 458, 470, and/or 472 is that the alert bar is presented upon messaging mode switching plus a few characters of input.

FIGS. 7-16 are presentations in a display of the communication device for depicting various actions associated with the methods described in relation to the steps in FIG. 4 and FIGS. 5-6. FIGS. 7-14 are provided in sequential order. FIGS. 15-16 are snapshot views of the presentation when the alert bar is moved in a continuous linear fashion from a hidden position to its final position. Note that these presentations are examples only.

In FIG. 7, what is shown is the display 222 of the communication device revealing the presentation of a message 602 being composed by a user. Message 602 is associated with a conversation thread 802, which may be displayed in a conversation thread field 608 simultaneously and together with a message composition field 606. Intended message recipients 702 of the message 602 may also be indicated for the message 602 (e.g. "Jim Taylor, Set Eisen . . . "). In this example, conversation thread 802 shown in FIG. 7 includes a message text string from the message participant named "Jim Taylor" which indicates or asks "Are you all going out tonight?", and a subsequent message text string from the message participant named "Set Eisen" which indicates or asks "I may. What about you?"

The processor of the communication device receives, via the user interface (e.g., through keyboard and/or touch screen display, for example), one or more character inputs 902 entered in message composition field 606 by the user. The example in FIG. 7 shows character inputs 902 which state "Where To Go?" A cursor 806 is set at the end of the message string in message composition field 606. Here, the character count is less than the warning count value, and less than the maximum number of characters permitted in the message segment. Accordingly, no alert bar, no number of remaining characters is presented in display 222.

However, the user will enter additional character inputs 902 into message composition field 606 of message 602. See e.g. FIG. 8 where one or more additional character inputs 902 are entered into message composition field 606. Here, the character count is still less than the warning count value, and less than the maximum number of characters permitted in the message segment. Thus, no alert bar, no number of remaining characters are presented in display 222.

In FIG. 9, it is shown that even additional character inputs 902 are entered by the user. Here, the character count exceeds the warning count value. However, the character count is still less than the maximum number of characters permitted in the (first) message segment. Accordingly, an alert bar 1100 having the number of remaining characters is presented in display 222. The number of message segments is also provided in alert bar 1100; the number of message segments is shown to be one (1) (i.e. 1 of 6).

In FIG. 10, it is shown that even more character inputs 902 are entered by the user. Here, the character count exceeds the maximum number of characters permitted in the (first) message segment. Accordingly, the alert bar having the number of remaining characters is removed or suppressed from the presentation. The character count is reset to zero (0), and the number of message segments is increased from one (1) to two (2).

In FIG. 11, it is shown that additional character inputs 902 are entered by the user. Here, the character count again exceeds the warning count value. However, the character count is less than the maximum number of characters permitted in the (second) message segment. Accordingly, alert bar 1100 having the number of remaining characters is again presented in display 222. The number of message segments is also provided in alert bar 1100; the number of message segments is shown to be two (2) (i.e. 2 of 6).

In FIG. 12, it is shown that more character inputs 902 are entered by the user. Here, the character count again exceeds the maximum number of characters permitted in the (second) message segment. Accordingly, the alert bar having the number of remaining characters is removed or suppressed from the presentation. The character count is reset to zero (0), and the number of message segments is increased from two (2) to three (3).

In FIG. 13, it is now assumed that the user has entered in a much larger number of additional character inputs 902. Here, the character count is so large that the number of message segments exceeds the maximum number of segments permitted in a message (e.g. for SMS messaging). Accordingly, alert bar 1100 having a messaging mode switching indication ("Switching To MMS Mode") is presented in display 222. No presentation of character/segment numbers is provided any further. In addition, a messaging mode indication 1302 ("MMS") may be presented in display 222. Subsequently in FIG. 14, the user has entered in a few more additional character inputs 902. Here, the character count exceeds the second warning count value. Accordingly, alert bar 1100 having the messaging mode switching indication ("Switching To MMS Mode") is removed or suppressed from the presentation, Messaging mode indication 1302 ("MMS") remains presented in display 222, so long as the character count exceeds the maximum count.

FIGS. 15-16 are presentations to help show in what manner alert bar 1100 may be initially presented in the display. Alert bar 1110 may be initially presented by being set in motion from an initial hidden position to a final revealed position, with several (continuous) intermediate positions therebetween, snapshots of which are shown in FIGS. 15-16. In its initial hidden position, alert bar 1100 is hidden (i.e. not showing at all, see e.g. FIG. 8) behind message composition field 606, and is set in motion "upwards" or raised from the hidden position to its final, fixed, revealed position (see e.g. FIG. 9). In one embodiment, each time alert bar 1100 is initially presented in the display (e.g. step 452 of FIG. 5, step 470 of FIG. 6), it is presented in this manner. Further, alert bar 1100 may additionally be removed or suppressed in the same albeit reverse manner (e.g. step 446 of FIG. 5, step 472 of FIG. 6), That is, when being removed or suppressed, alert bar 1100 is set in motion "downwards" or lowered from the fixed revealed position (see e.g. FIG. 9) to the hidden position (i.e. not showing at all, see e.g. FIG. 8) behind message composition field 606, with several (continuous) intermediate positions therebetween, snapshots of which are shown in FIGS. 15-16.

Thus, methods and apparatus for use in providing presentations for the composition of messages having size limitations have been described. A communication device receives, via its user interface, one or more character inputs in a message composition field for a new message being composed. While a character count of the message is less than a warning count value, the device refrains from presenting the number of allowed characters remaining for entry in the message. On the other hand, while the character count is greater than or equal to the warning count value, the device causes the number of allowed characters remaining for entry in the message to be presented. The device then causes the message to be transmitted via a wireless network via a short message service (SMS). In one example, the number of allowed characters remaining for entry is provided in an alert bar, which is presented by being set in motion from an initial hidden position behind the message composition field to a final revealed position, with intermediate positions therebetween.

The above-described embodiments of disclosure are intended to be examples only. For example, the techniques may apply to other types of messages such as instant messages or email messages. Alterations, modifications, and variations may be effected to particular embodiments by those of skill in art without departing from scope of invention, which is defined solely by claims appended hereto.

What is claimed is:

1. A method for use in a communication device, the method comprising:
providing a message composition interface; and
presenting a maximum allowable remaining number of characters allowable for further entry in the message only when a character count of the number of character inputs received in the message is greater than or equal to a warning count value, the warning count value being less than a maximum allowable number of characters of the message.

2. The method of claim 1, wherein the message comprises a message segment.

3. The method of claim 1, wherein the message comprises a message segment, and the maximum allowable number of characters of the message segment is one hundred and sixty four (164).

4. The method of claim 1, further comprising:
presenting a number of message segments in the message along with the maximum allowable remaining number of characters allowable for further entry in the message only when the character count is greater than or equal to the warning count value.

5. The method of claim 1, further comprising:
when the character count meets the warning count value, presenting an alert bar which includes the maximum allowable remaining number of characters allowable for further entry in the message.

6. The method of claim 1, wherein the warning count value is less than the maximum allowable number of characters by a predetermined number, the predetermined number being ten (10).

7. The method of claim 1, further comprising:
when the character count meets the warning count value, presenting an alert bar which includes the maximum allowable remaining number of characters allowable for further entry in the message; and
after the character count meets the warning count value, when the character count becomes less than the warning count value, removing the presentation of the alert bar which includes the maximum allowable remaining number of characters allowable for further entry in the message.

8. The method of claim 1, wherein the message includes a first message segment, the method further comprising:
when the character count exceeds the maximum allowable number of characters in the first message segment:
producing a second message segment for the message; and
incrementing a count of the number of message segments for the message.

9. The method of claim 1, further comprising:
maintaining a message segment count for the message; and
when the message segment count exceeds a maximum allowable number of segments permitted for the message, presenting a messaging mode switching indicator.

10. The method of claim 1, further comprising:
formatting the message for transmission via a Short Message Service (SMS).

11. A computer readable medium, comprising:
a non-transitory computer readable medium;
computer instructions stored in the non-transitory computer readable medium;
the computer instructions being executable by one or more processors of a communication device for providing a presentation for composition of a message by performing the actions of:
providing a message composition interface; and
presenting a maximum allowable remaining number of characters allowable for further entry in the message only when a character count of the number of character inputs received in the message is greater than or equal to a warning count value, the warning count value being less than a maximum allowable number of characters of the message.

12. A wireless communication device, comprising:
one or more processors;
a wireless transceiver coupled to the one or more processors;
a user interface coupled to the one or more processors, the user interface comprising a display;
memory coupled to the one or more processors;
the one or more processors being configured to:
provide a message composition interface in the user interface; and
present a maximum allowable remaining number of characters allowable for further entry in the message only when a character count of the number of character inputs received in the message is greater than or equal to a warning count value, the warning count value being less than a maximum allowable number of characters of the message.

13. The wireless communication device of claim 12, wherein the message comprises a message segment.

14. The wireless communication device of claim 12, wherein the message comprises a message segment, and the maximum allowable number of characters of the message segment is one hundred and sixty four (164).

15. The wireless communication device of claim 12, wherein the one or more processors are further configured to:
present a number of message segments in the message along with the maximum allowable remaining number of characters allowable for further entry in the message only when the character count is greater than or equal to the warning count value.

16. The wireless communication device of claim 12, wherein the one or more processors are further configured to:
when the character count meets the warning count value, present an alert bar which includes the maximum allowable remaining number of characters allowable for further entry in the message.

17. The wireless communication device of claim 12, wherein the warning count value is less than the maximum allowable number of characters by a predetermined number, the predetermined number being ten (10).

18. The wireless communication device of claim 12, wherein the one or more processors are further configured to:
when the character count meets the warning count value, present an alert bar which includes the maximum allowable remaining number of characters allowable for further entry in the message; and
after the character count meets the warning count value, when the character count becomes less than the warning count value, remove the presentation of the alert bar which includes the maximum allowable remaining number of characters allowable for further entry in the message.

19. The wireless communication device of claim 12, wherein the message includes a first message segment, and the one or more processors are further configured to:
when the character count exceeds the maximum allowable number of characters in the first message segment:
produce a second message segment for the message; and
increment a count of the number of message segments for the message.

20. The wireless communication device of claim 12, wherein the one or more processors are further configured to:
maintain a message segment count for the message; and
when the message segment count exceeds a maximum allowable number of segments permitted for the message, present a messaging mode switching indicator.

* * * * *